(12) United States Patent
Sennoun

(10) Patent No.: US 9,222,411 B2
(45) Date of Patent: Dec. 29, 2015

(54) BLEED AIR AND HOT SECTION COMPONENT COOLING AIR SYSTEM AND METHOD

(75) Inventor: Mohammed El Hacin Sennoun, West Chester, OH (US)

(73) Assignee: General Electric Company, Schenectady, NY (US)

( * ) Notice: Subject to any disclaimer, the term of this patent is extended or adjusted under 35 U.S.C. 154(b) by 832 days.

(21) Appl. No.: 13/537,284

(22) Filed: Jun. 29, 2012

(65) Prior Publication Data

US 2013/0164115 A1 Jun. 27, 2013

Related U.S. Application Data

(60) Provisional application No. 61/578,443, filed on Dec. 21, 2011.

(51) Int. Cl.
| | | |
|---|---|---|
| *F02C 7/14* | (2006.01) | |
| *F01D 25/12* | (2006.01) | |
| *F02C 6/08* | (2006.01) | |
| *F02C 7/18* | (2006.01) | |

(52) U.S. Cl.
CPC . *F02C 6/08* (2013.01); *F01D 25/12* (2013.01); *F02C 7/185* (2013.01); *Y02T 50/675* (2013.01)

(58) Field of Classification Search
CPC ............ F02C 7/185; F02C 6/08; F01D 25/08; F01D 25/12; F01D 25/14
USPC ..................................... 415/144, 145; 60/785
See application file for complete search history.

(56) References Cited

U.S. PATENT DOCUMENTS

| | | |
|---|---|---|
| 3,475,906 A | 11/1969 | Madelung et al. |
| 3,826,084 A | 7/1974 | Branstrom et al. |
| 3,981,466 A | 9/1976 | Shah |
| 4,254,618 A | 3/1981 | Elovic |

(Continued)

FOREIGN PATENT DOCUMENTS

| | | |
|---|---|---|
| CN | 101946073 A | 1/2011 |
| EP | 0511935 A1 | 11/1992 |

(Continued)

OTHER PUBLICATIONS

Search Report and Written Opinion from PCT/2012/068327 dated Oct. 1, 2013.

(Continued)

*Primary Examiner* — Igor Kershteyn
*Assistant Examiner* — Jesse Prager
(74) *Attorney, Agent, or Firm* — General Electric Company; William Scott Andes

(57) ABSTRACT

Combined bleed air and hot section component cooling air systems for gas turbine engines and methods of operating combined bleed air and hot section component cooling air systems are disclosed. An example system may include a high-pressure bleed air line receiving high-pressure bleed air; a precooler receiving at least some of the high-pressure bleed air and discharging cooled high-pressure bleed air; a pressure regulator receiving at least some of the cooled high-pressure bleed air and discharging pressure-regulated cooled bleed air to a pneumatic systems supply line; and/or a hot section component cooling air line connected upstream of the first pressure regulator and configured to convey at least some of the cooled high-pressure bleed air to a hot section component for use as hot section component cooling air.

10 Claims, 7 Drawing Sheets

(56) References Cited

U.S. PATENT DOCUMENTS

| | | | |
|---|---|---|---|
| 4,404,793 A * | 9/1983 | Coffinberry | ............... 60/785 |
| 4,482,114 A | 11/1984 | Gupta et al. | |
| 4,779,644 A * | 10/1988 | Benson | ............... 137/606 |
| 5,137,230 A | 8/1992 | Coffinberry | |
| 5,203,163 A | 4/1993 | Parsons | |
| 5,452,573 A | 9/1995 | Glickstein et al. | |
| 5,729,969 A | 3/1998 | Porte | |
| 5,782,077 A | 7/1998 | Porte | |
| 5,860,283 A | 1/1999 | Coleman et al. | |
| 6,202,403 B1 | 3/2001 | Laborie et al. | |
| 6,305,156 B1 | 10/2001 | Lui | |
| 6,629,428 B1 | 10/2003 | Murry | |
| 7,740,443 B2 | 6/2010 | Seitzer et al. | |
| 7,823,389 B2 | 11/2010 | Seitzer et al. | |
| 7,856,824 B2 | 12/2010 | Anderson et al. | |
| 7,862,293 B2 | 1/2011 | Olver | |
| 2003/0000222 A1 * | 1/2003 | Tsuji | ............... 60/785 |
| 2008/0112798 A1 * | 5/2008 | Seitzer et al. | ............... 415/144 |
| 2008/0314573 A1 | 12/2008 | Schwarz et al. | |
| 2009/0188234 A1 * | 7/2009 | Suciu et al. | ............... 60/262 |
| 2010/0107594 A1 | 5/2010 | Coffinberry et al. | |
| 2010/0154434 A1 | 6/2010 | Kubota et al. | |
| 2010/0323601 A1 | 12/2010 | Cremers et al. | |
| 2013/0133334 A1 * | 5/2013 | Strecker et al. | ............... 60/782 |

FOREIGN PATENT DOCUMENTS

| | | |
|---|---|---|
| EP | 1698763 A1 | 9/2006 |
| EP | 2009260 A2 | 12/2008 |
| EP | 2213864 A2 | 8/2010 |

OTHER PUBLICATIONS

"Pneumatic System", http://www.boeing-727.com/Data/systems/infopneumat.html, Jan. 27, 2011, 4 pages.

"Air Systems—Pneumatics", Boeing 757 Air Systems :: Pneumatics, http://www.biggles-software.com/software/757_tech/air_systems/pneumatics.htm, Jan. 27, 2011, 3 pages.

Unofficial English Translation of Japanese Office Action issued in connection with corresponding JP Application No. 2014549089 on Aug. 4, 2015.

Unofficial English Translation of Chinese Office Action issued in connection with corresponding CN Application No. 201280070328.X on Aug. 5, 2015.

Canadian Office Action issued in connection with corresponding CA Application No. 2859763 on Jun. 23, 2015.

* cited by examiner

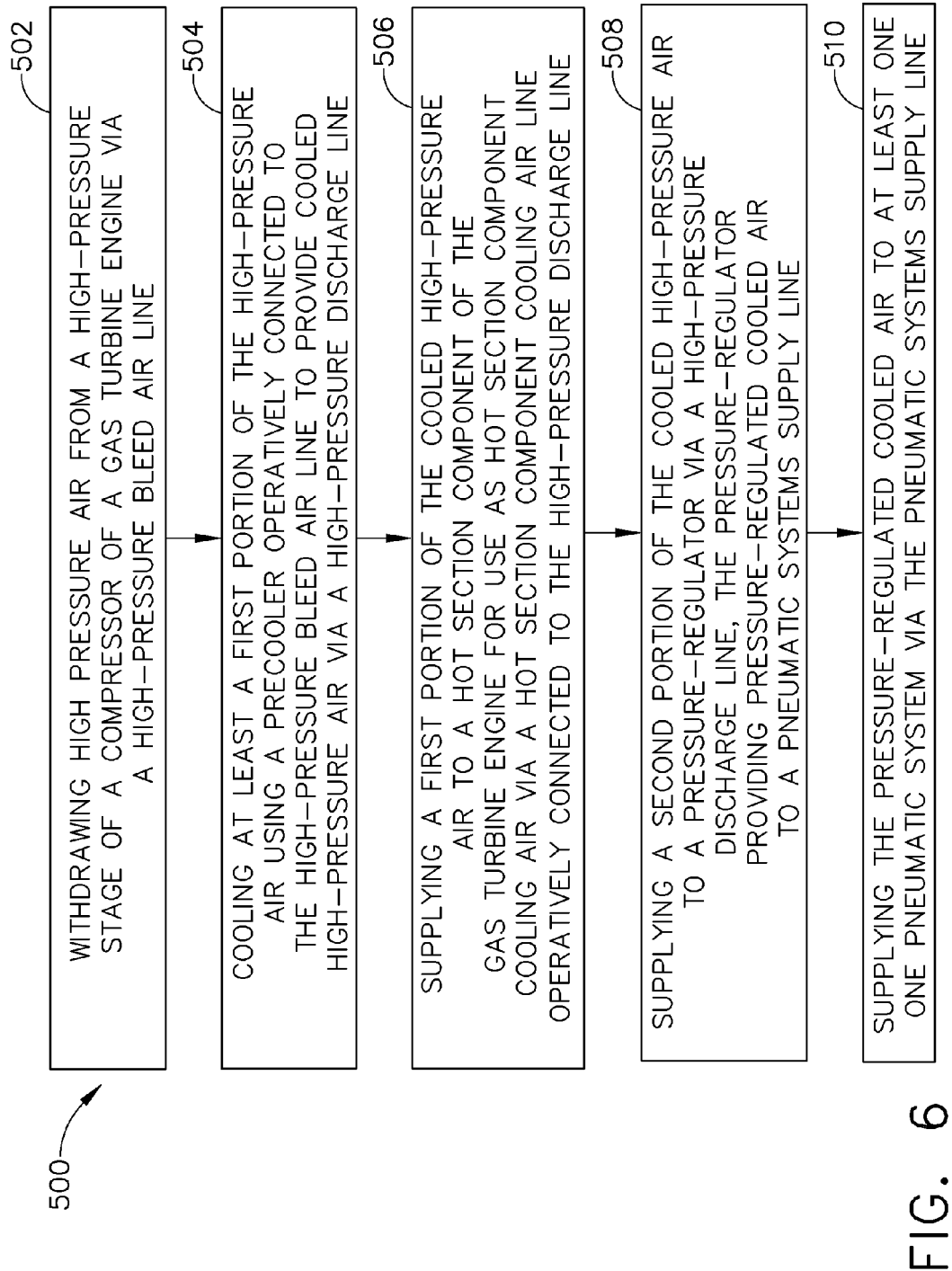

BLEED AIR AND HOT SECTION COMPONENT COOLING AIR SYSTEM AND METHOD

CROSS REFERENCE TO RELATED APPLICATION

This application claims the benefit of U.S. Provisional Application No. 61/578,443, filed Dec. 21, 2011, which is incorporated by reference.

BACKGROUND

The subject matter disclosed herein relates generally to gas turbine engines and, more particularly, to bleed air and hot section component cooling air systems for gas turbine engines and methods of operating bleed air and hot section component cooling air systems.

Some gas turbine engines include an air flow path through a low pressure compressor, a high pressure compressor, a combustor, a high pressure turbine, and a low pressure turbine. Some gas turbine engines may be configured to withdraw compressed air from the high pressure compressor and provide the compressed air for use in various aircraft and/or engine systems. As used herein, compressed air taken from a compressor of a gas turbine engine may be referred to as "bleed air."

In some gas turbine engines, the temperature of the gas stream exiting the combustor may be above about 1500 degrees C. To prevent undesired thermal effects on turbine components due to exposure to the high-temperature gas stream, some components of the turbine may be cooled. For example, bleed air may be supplied to one or more hot section components (e.g., high pressure turbine blades) for cooling. As used herein, bleed air used for hot section component cooling may be referred to as "hot section component cooling air."

The problem: Withdrawing bleed air from a compressor of a gas turbine engine may reduce the efficiency of the gas turbine engine.

BRIEF DESCRIPTION OF THE INVENTION

The solution for the above-mentioned problem is provided by example embodiments of the present disclosure.

Some example combined bleed air and hot section component cooling air systems for gas turbine engines according to at least some aspects of the present disclosure may include a high-pressure bleed air line configured to receive high-pressure bleed air from a high-pressure stage of a compressor; a first precooler operatively connected to the high-pressure bleed air line to receive at least some of the high-pressure bleed air, transfer heat from the high-pressure bleed air to ambient air, and discharge cooled high-pressure bleed air; a high-pressure discharge line operatively connected to the first precooler to receive the cooled high-pressure bleed air; a first pressure regulator in the high-pressure discharge line, the first pressure regulator being configured to receive at least some of the cooled high-pressure bleed air and discharge pressure-regulated cooled bleed air; a pneumatic systems supply line operatively connected to the high-pressure discharge line downstream of the first pressure regulator to receive the pressure-regulated cooled bleed air; and/or a hot section component cooling air line operatively connected to the high-pressure discharge line upstream of the first pressure regulator and configured to convey at least some of the cooled high-pressure bleed air to a hot section component for use as hot section component cooling air.

Some example combined bleed air and hot section component cooling air systems for gas turbine engines according to at least some aspects of the present disclosure may include a high-pressure bleed air line configured to receive high-pressure bleed air from a high-pressure stage of a compressor; a first precooler operatively connected to the high-pressure bleed air line, the first precooler being configured to receive at least some of the high-pressure bleed air, transfer heat from the high-pressure bleed air to ambient air, and discharge cooled high-pressure bleed air; a high-pressure discharge line operatively connected to the first precooler to receive the cooled high-pressure bleed air; an intermediate-pressure bleed air line configured to receive intermediate-pressure bleed air from an intermediate stage of the compressor; a second precooler operatively connected to the intermediate-pressure bleed air line, the second precooler being configured to receive the intermediate-pressure bleed air, transfer heat from the intermediate-pressure bleed air to the ambient air, and discharge cooled intermediate-pressure bleed air; an intermediate-pressure discharge line operatively connected to the second precooler to receive the cooled intermediate-pressure bleed air; a first pressure regulator operatively connected to at least one of the high-pressure discharge line and the intermediate-pressure discharge line, the first pressure regulator being operative to discharge pressure-regulated cooled bleed air; and/or a pneumatic systems supply line operatively connected to the first pressure regulator to receive the pressure-regulated cooled bleed air; a hot section component cooling air line operatively connected to the high-pressure discharge line upstream of the pressure regulator and configured to convey at least some of the cooled high-pressure bleed air to a hot section component for use as hot section component cooling air.

Some example methods of operating a combined bleed air and hot section component cooling air system according to at least some aspects of the present disclosure may include withdrawing high-pressure air from a high-pressure stage of a compressor of a gas turbine engine via a high-pressure bleed air line; cooling at least a first portion of the high-pressure air using a precooler operatively connected to the high-pressure bleed air line to provide cooled high-pressure air via a high-pressure discharge line; supplying a first portion of the cooled high-pressure air to a hot section component of the gas turbine engine for use as hot section component cooling air via a hot section component cooling air line operatively connected to the high-pressure discharge line; supplying a second portion of the cooled high-pressure air to a pressure regulator via the high-pressure discharge line, the pressure regulator providing pressure-regulated cooled air to a pneumatic systems supply line; and/or supplying the pressure-regulated cooled air to at least one pneumatic system via the pneumatic systems supply line.

The foregoing brief description is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Example embodiments are described herein with reference to the drawings, in which:

FIG. 6 is a flowchart illustrating an example method of operating a combined bleed air and hot section component cooling air system; all in accordance with at least some aspects of the present disclosure.

DETAILED DESCRIPTION

Figure 1:
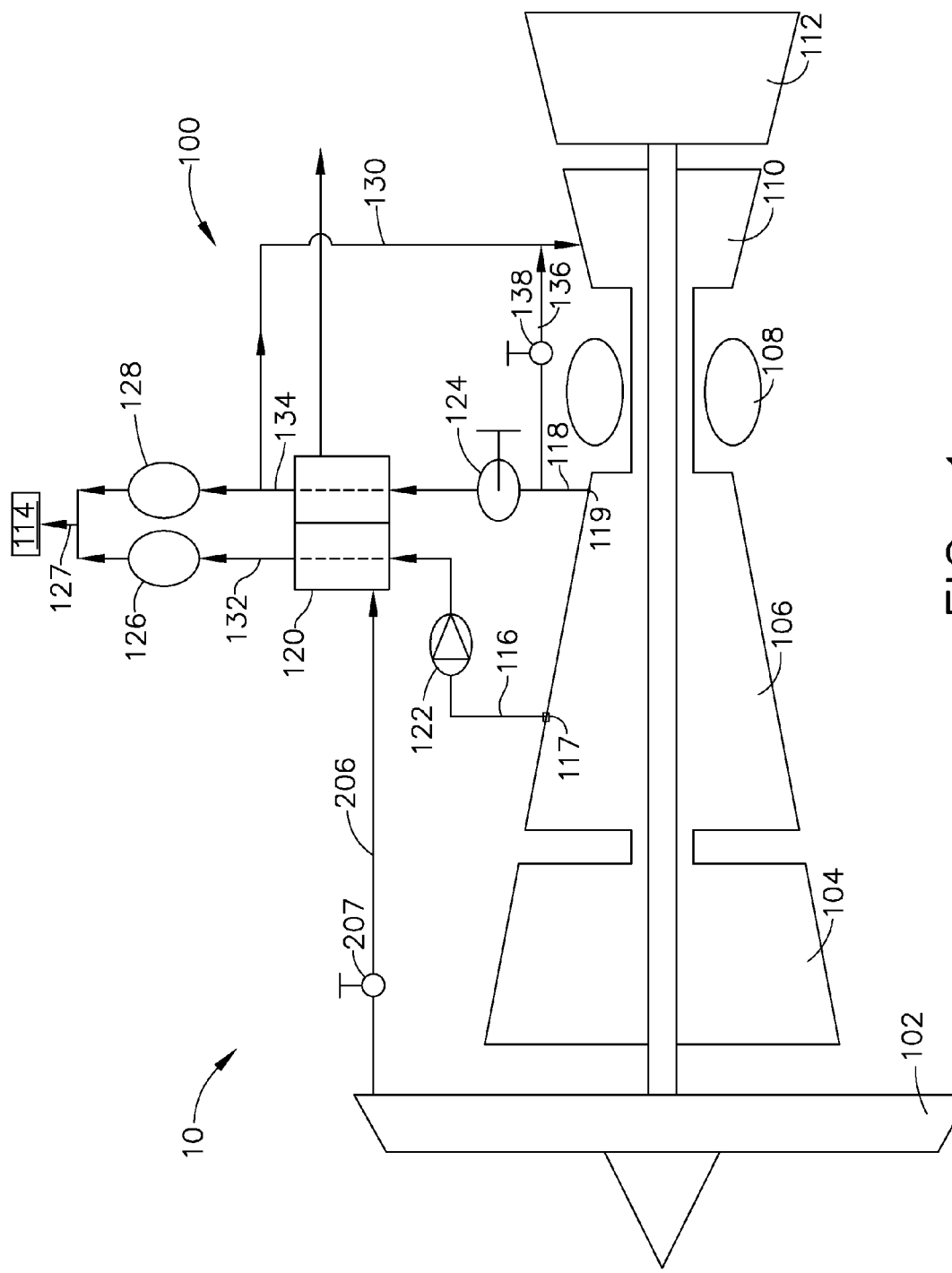
FIG. 1 is a block diagram of an example combined bleed air and hot section component cooling air system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure includes, inter alia, combined bleed air systems and hot section component cooling air systems associated with gas turbine engines and methods of operating combined bleed air and hot section component cooling air systems.

FIG. 1 is a block diagram of an example gas turbine engine 10, according to at least some aspects of the present disclosure. Engine 10 may be configured to flow air through a fan 102, a low-pressure compressor 104, a high-pressure compressor 106, a combustor 108, a high-pressure turbine 110, and/or a low-pressure turbine 112. Engine 10 may include a combined bleed air and hot section component cooling air system 100, which may be configured to provide bleed air (e.g., compressed air taken from low-pressure compressor 104 and/or high-pressure compressor 106) to one or more pneumatic systems 114, such as an aircraft environmental control system (ECS). Other example pneumatic systems which may utilize bleed air include, without limitation, wing anti-icing systems, engine cowl anti-icing systems, pneumatic actuators, and engine starting systems.

Bleed air may be taken from one or more stages of low-pressure compressor 104 and/or high-pressure compressor 106. For example, intermediate-pressure bleed air may be taken from an intermediate stage (e.g., via an intermediate-pressure bleed air line 116, which may be connected to an extraction port 117 approximate a fourth stage of high-pressure compressor 106) and/or high-pressure bleed air may be taken from a high-pressure stage (e.g., via a high-pressure bleed air line 118, which may be connected to an extraction port 119 approximate a seventh stage of high-pressure compressor 106). In some example embodiments in which extraction port 119 is disposed approximate a final stage of high-pressure compressor 106, high-pressure bleed air line 118 may receive bleed air at about compressor discharge pressure.

Intermediate-pressure bleed air line 116 and/or high-pressure bleed air line 118 may direct bleed air to a precooler 120. Intermediate-pressure bleed air line 116 and/or high-pressure bleed air line 118 may include one or more valves between high-pressure compressor 106 and precooler 120. For example, intermediate-pressure bleed air line 116 may include a check valve 122, which may be arranged to allow air flow from high-pressure turbine 106 to precooler 120 while substantially preventing air flow from precooler 120 to high-pressure turbine 106. High-pressure bleed air line 118 may include an isolation valve 124, which may be selectively operable to allow and substantially prevent air flow from high-pressure compressor 106 to precooler 120.

As described below in connection with FIGS. 2A and 2B, precooler 120 may comprise a heat exchanger configured to transfer heat from the bleed air to ambient air 206, which may be supplied from fan 102. For example, precooler 120 may be configured to cool the bleed air to less than about 230 degrees C. by transferring heat to cooling stream air, such as, but not limited to, ambient, fan, or bypass streams. For example, precooler 120 may transfer heat to ambient air 206, which may be supplied via fan 102 as a fan stream. Some example embodiments may include a fan air valve 207, which may be arranged to allow, prevent, and/or regulate ambient air 206 supplied from fan 102. Precooler 120 may be configured to discharge cooled intermediate-pressure bleed air via an intermediate-pressure discharge line 132 and/or precooler 120 may be configured to discharge cooled high-pressure bleed air via a high-pressure discharge line 134. In some example embodiments, a position (e.g., open-shut) of fan air valve 207 may be controlled at least in part based upon a temperature of cooled intermediate-pressure bleed air in intermediate-pressure discharge line 132 and/or a temperature of cooled high-pressure bleed air in high-pressure discharge line 134. Some example embodiments may include separate precoolers operatively coupled to intermediate-pressure bleed air line 116 and high-pressure bleed air line 118. Such embodiments may be configured in a parallel or series flow arrangements from the perspective of ambient air 206.

Intermediate-pressure discharge line 132 may supply pressure-regulated cooled bleed air to pneumatic systems 114 via one or more pressure-regulators, such as pressure-regulating shut-off valve 126. High-pressure discharge line 134 may supply pressure-regulated cooled bleed air to pneumatic systems 114 via one or more pressure-regulators, such as a pressure-regulating shut-off valve 128. In some example embodiments, pressure-regulating shut-off valve 126 and/or pressure-regulating shut-off valve 128 may be configured to supply pressure-regulated cooled bleed air to pneumatic systems 114 at about 30 psig to about 40 psig (about 207 kPa to about 276 kPa) via pneumatic systems supply line 127.

Some example combined bleed air and hot section component cooling air systems 100 may be configured to supply hot section component cooling air to one or more hot section components, such as high-pressure turbine 110, for cooling. For example, hot section component cooling air may be supplied to turbine blades and/or vanes for cooling. Hot section component cooling air may be supplied from high-pressure compressor 106 to high-pressure turbine 110 via high-pressure bleed air line 118, valve 124, precooler 120, high-pressure discharge line 134, and a hot section component cooling air line 130, which may be connected to high-pressure discharge line 134. Because hot section component cooling air line 130 may receive cooled high-pressure bleed air that has flowed through precooler 120, hot section component cooling air line 130 may supply hot section component cooling air to high-pressure turbine 110 at a temperature lower than the temperature of high-pressure bleed air taken from high-pressure compressor 106 by high-pressure bleed air line 118.

Some example combined bleed air and hot section component cooling air systems 100 may be configured to supply hot section component cooling air to high-pressure turbine 110 from high-pressure compressor 106 without flowing the hot section component cooling air through precooler 120. For example, some combined bleed air and hot section component cooling air systems 100 may include a bypass line 136, which may include a bypass line valve 138. If it is desired to supply some or all hot section component cooling air directly from high pressure compressor 106, bypass line valve 138 may be partially or fully opened. If it is desired to supply some or all hot section component cooling air via precooler 120, valve 124 may be partially or fully opened. In some example embodiments, valve 124 and/or bypass line valve 138 may be throttled to achieve a desired flow rate therethrough. Some example embodiments may not include valve 124, bypass line 136, and/or bypass line valve 138. Some example embodiments may be configured to supply hot section cooling air comprising both cooled air (e.g., via hot section component cooling air line 130) and uncooled air (e.g., via bypass line 136), such as by at least partially opening both valve 124 and bypass line valve 138.

Figure 2A:
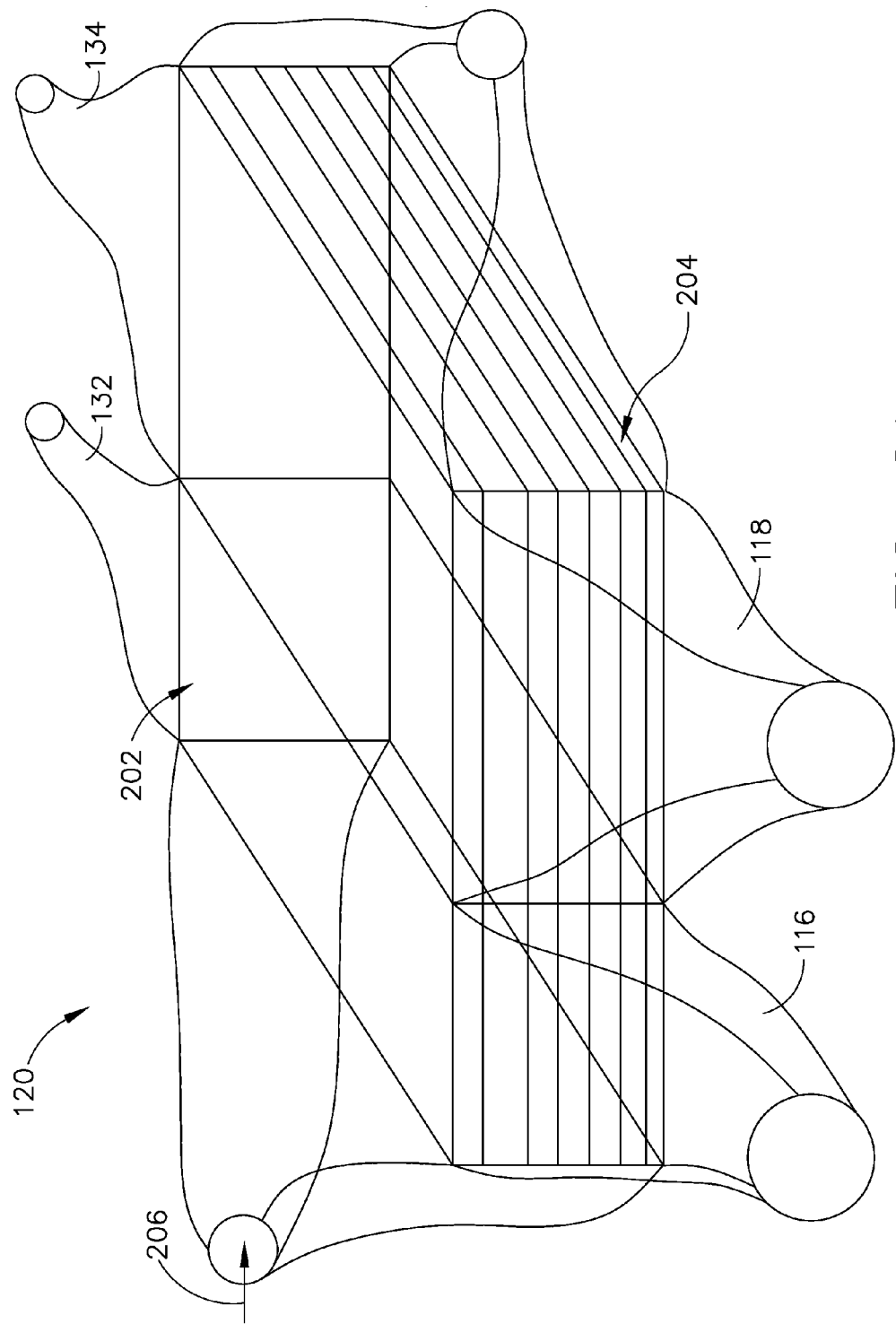
FIG. 2A is a perspective view of an example two-compartment precooler.

FIG. 2A is a perspective view of an example two-compartment precooler 120, according to at least some aspects of the present disclosure. It is within the scope of this disclosure to use any known suitable heat exchanger, such as one or more known precoolers. Precooler 120 may include a first compartment 202 configured to receive air from intermediate-pressure bleed air line 116 and discharge air to intermediate-pressure discharge line 132. Precooler 120 may include a second compartment 204 configured to receive air from high-pressure bleed air line 118 and discharge air to high-pressure discharge line 134. First compartment 202 and second compartment 204 may be disposed approximate one another to comprise two-compartment precooler 120 in a series flow arrangement from the perspective of ambient air 206. Individual compartments 202, 204 may be referred to as precoolers and/or one or more compartments and/or one or more separate precoolers in a bleed air system (see, e.g., FIG. 4) may be collectively referred to as a precooler.

Precooler 120 may be configured to thermally contact ambient air 206 (such as from fan 102 (FIG. 1)) with air flowing through first compartment 202 and/or second compartment 204. For example, ambient air 206 may be thermally contacted with air flowing through compartment 202 and/or air flowing through compartment 204 in a cross-flow arrangement and/or a counterflow arrangement. In some example embodiments, precooler 120 may be sized and/or shaped to allow use in connection with existing air scoops and/or fan air valves.

Figure 2B:
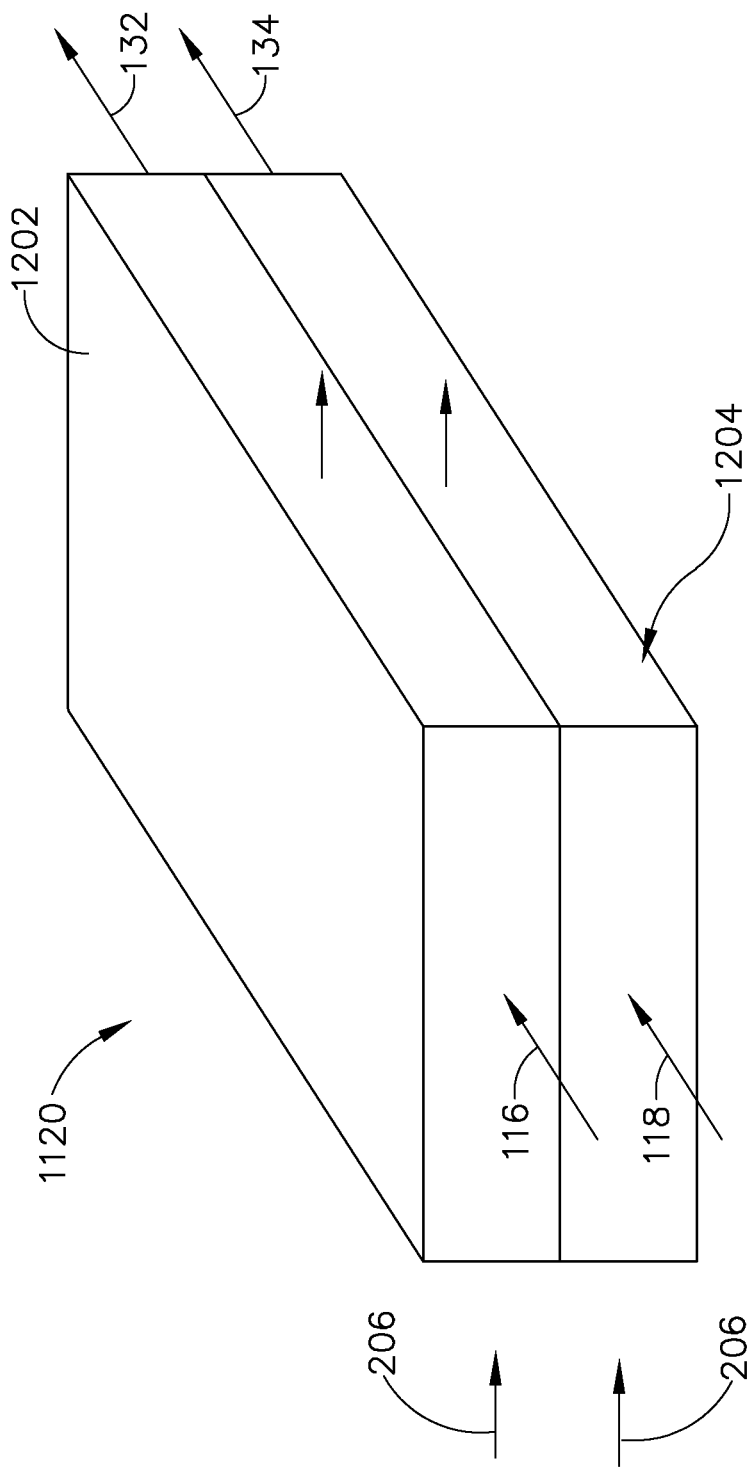
FIG. 2B is a perspective view of an alternative example two-compartment precooler.

FIG. 2B is a perspective view of an alternative example two-compartment precooler 1120, according to at least some aspects of the present disclosure. It is within the scope of this disclosure to use any known suitable heat exchanger, such as one or more known precoolers. Precooler 1120 may include a first compartment 1202 configured to receive air from intermediate-pressure bleed air line 116 and discharge air to intermediate-pressure discharge line 132. Precooler 120 may include a second compartment 1204 configured to receive air from high-pressure bleed air line 118 and discharge air to high-pressure discharge line 134. First compartment 1202 and second compartment 1204 may be disposed approximate one another to comprise two-compartment precooler 120 in a parallel flow arrangement from the perspective of ambient air 206. Individual compartments 1202, 1204 may be referred to as precoolers and/or one or more compartments and/or one or more separate precoolers in a bleed air system (see, e.g., FIG. 4) may be collectively referred to as a precooler.

Precooler 1120 may be configured to thermally contact ambient air 206 (such as from fan 102 (FIG. 1)) with air flowing through first compartment 1202 and/or second compartment 1204. For example, ambient air 206 may be thermally contacted with air flowing through compartment 1202 and/or air flowing through compartment 1204 in a cross-flow arrangement and/or a counterflow arrangement. In some example embodiments, precooler 1120 may be sized and/or shaped to allow use in connection with existing air scoops and/or fan air valves.

In some engine operating conditions (e.g., low engine RPM), it may be desirable to utilize bleed air obtained via extraction port 119 and high-pressure bleed air line 118 for hot section component cooling and/or pneumatic systems 114. In some engine operating conditions (e.g., high engine RPM), it may be desirable to utilize bleed air obtained via extraction port 117 and intermediate-pressure bleed air line 116 for pneumatic systems 114 and/or bleed air obtained via extraction port 119 and high-pressure bleed air line 118 for hot section component cooling.

The present disclosure contemplates that the amount of turbine cooling air required to achieve desired hot section component cooling may depend upon the temperature of the hot section component cooling air supplied to the hot section component. For example, hot section component cooling effectiveness, $\epsilon$, may be given by the following equation:

$$\varepsilon = \frac{dT}{T_{combustor\ outlet} - T_{cooling\ air}}$$

where $T_{combustor\ outlet}$ may be the temperature of the gas stream exiting combustor 108 and $T_{cooling\ air}$ may be the temperature of the hot section component cooling air supplied to high pressure turbine 110.

Hot section component cooling effectiveness may be considered at two cooling air temperatures, $T_{cooling\ air_1}$ and $T_{cooling\ air_2}$, to provide a hot section component cooling effectiveness ratio, $$\frac{\varepsilon_2}{\varepsilon_1} : \frac{\varepsilon_2}{\varepsilon_1} = \frac{T_{combustor\ outlet} - T_{cooling\ air_2}}{T_{combustor\ outlet} - T_{cooling\ air_1}}$$

In an example embodiment, $T_{combustor\ outlet}$ may be about 1600 degrees C. and/or high-pressure bleed air obtained from extraction port 119 may be about 670 degrees C. Thus, hot section component cooling air supplied via bypass line 136 may provide a $T_{cooling\ air_1}$ of about 670 degrees C. Hot section component cooling air supplied via precooler 120 and cooling air line 130 may provide a $T_{cooling\ air_2}$ of about 230 degrees C.

These example hot section component cooling air temperatures may provide a hot section component cooling effectiveness ratio, $$\frac{\varepsilon_2}{\varepsilon_1},$$

of about 1.5. Supplying hot section component cooling air at about 230 degrees C. may allow use of about 50% less air than if hot section component cooling air is supplied at about 670 degrees C. Under some conditions, such a reduction in cooling air may contribute to a significant improvement in engine efficiency, which may correspond to a significant decrease in specific fuel consumption.

Figure 3:
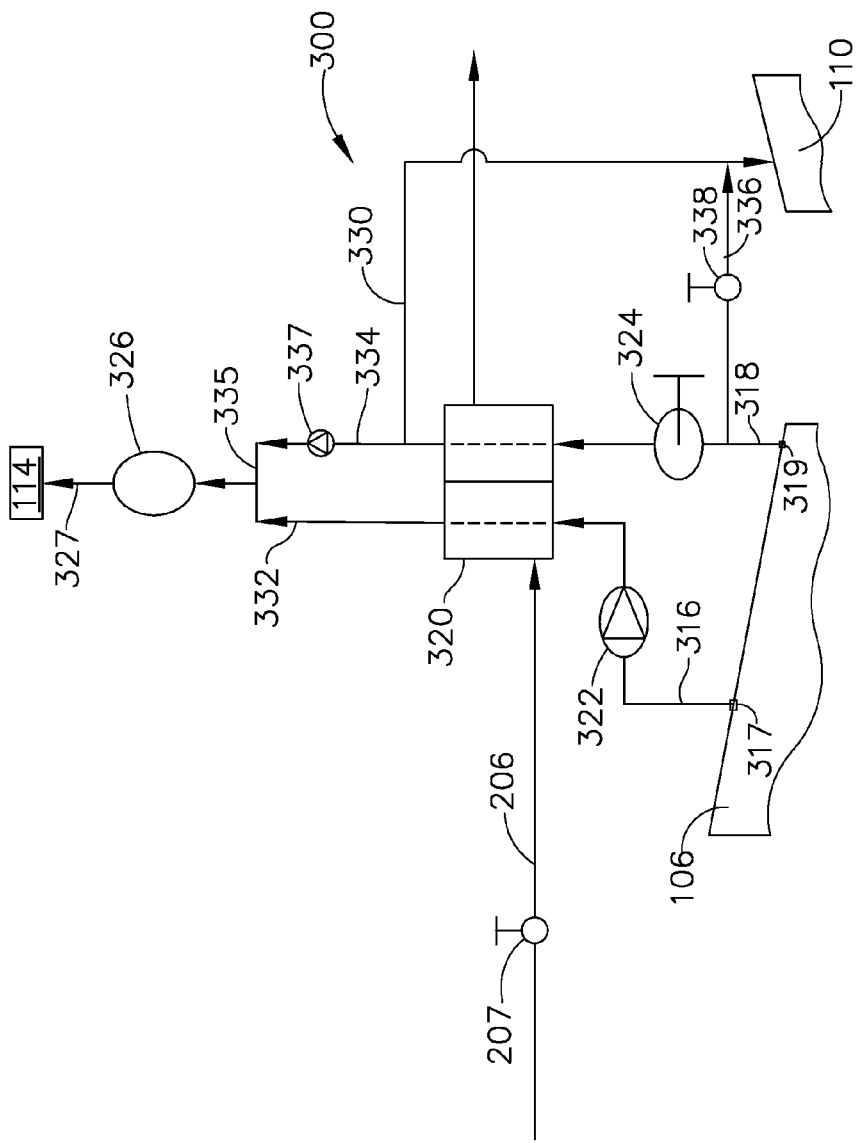
FIG. 3 is a block diagram of an alternative example combined bleed air and hot section component cooling air system.

FIG. 3 is a block diagram of an alternative example combined bleed air and hot section component cooling air system 300, which may be configured to provide bleed air from high-pressure compressor 106 to one or more pneumatic systems 114 and/or to high-pressure turbine 110, according to at least some aspects of the present disclosure. For example, intermediate-pressure bleed air may be taken from high-pressure compressor 106 via an extraction port 317 and an intermediate-pressure bleed air line 316, which may be connected approximate a fourth stage of high-pressure compressor 106, and/or high-pressure bleed air may be taken from high-pressure compressor via an extraction port 319 and a high-pressure bleed air line 318, which may be connected approximate a seventh stage of high-pressure compressor 106.

Intermediate-pressure bleed air line 316 and/or high-pressure bleed air line 318 may direct bleed air to a precooler 320. As described above in connection with FIGS. 2A and 2B, precooler 320 may comprise a heat exchanger configured to transfer heat from the bleed air to ambient air 206, which may be supplied from fan 102 (FIG. 1). Some example embodiments may include fan air valve 207, which may be arranged to allow, prevent, and/or regulate ambient air 206 supplied from fan 102 (FIG. 1). Precooler 320 may be configured to discharge cooled intermediate-pressure bleed air via an intermediate-pressure discharge line 332 and/or precooler 320 may be configured to discharge cooled high-pressure bleed air via a high-pressure discharge line 334. In some example embodiments, a position (e.g., open-shut) of fan air valve 207 may be controlled at least in part based upon a temperature of cooled intermediate-pressure bleed air in intermediate-pressure discharge line 332 and/or a temperature of cooled high-pressure bleed air in high-pressure discharge line 334. Intermediate-pressure discharge line 332 and high-pressure discharge line 334 may join to form a precooler discharge header 335. Precooler discharge header 335 may supply pressure-regulated cooled bleed air to pneumatic systems 114 via one or more pressure-regulators, such as pressure-regulating shut-off valve 326, and/or pneumatic systems supply line 327.

Intermediate-pressure bleed air line 316 and/or high-pressure bleed air line 318 may include one or more valves between high-pressure compressor 106 and precooler 320. For example, intermediate-pressure bleed air line 316 may include a check valve 322, which may be arranged to allow air flow from high-pressure compressor 106 to precooler 320 while substantially preventing air flow from precooler 320 to high-pressure compressor 106. High-pressure bleed air line 318 may include an isolation valve 324, which may be selectively operable to allow and substantially prevent air flow from high-pressure compressor 106 to precooler 320.

Hot section component cooling air may be supplied from high-pressure compressor 106 to high-pressure turbine 110 via high-pressure bleed air line 318, valve 324, precooler 320, high-pressure discharge line 334, and a hot section component cooling air line 330, which may be connected to high-pressure discharge line 334. Because hot section component cooling air line 330 may receive cooled high-pressure bleed air that has flowed through precooler 320, cooling air line 330 may supply cooling air to high-pressure turbine 110 at a temperature lower than the temperature of high-pressure bleed air taken from high-pressure compressor 106 by high-pressure bleed air line 318. In some example embodiments, a check valve 337 may be disposed in high-pressure discharge line 334, such as downstream of hot section component cooling air line 330.

Some example combined bleed air and hot section component cooling air systems 300 may be configured to supply hot section component cooling air to high-pressure turbine 110 directly from high-pressure compressor 106. For example, some combined bleed air and hot section component cooling air systems 300 may include a bypass line 336, which may include a bypass line valve 338. If it is desired to supply some or all hot section component cooling air directly from high pressure compressor 106, bypass line valve 338 may be partially or fully opened. If it is desired to supply some or all hot section component cooling air via precooler 320, valve 324 may be partially or fully opened. In some example embodiments, valve 324 and/or bypass line valve 338 may be throttled to achieve a desired flow rate therethrough. Some example embodiments may be configured to supply hot section cooling air comprising both cooled air (e.g., via hot section component cooling air line 330) and uncooled air (e.g., via bypass line 336), such as by at least partially opening both valve 324 and bypass line valve 338.

Figure 4:
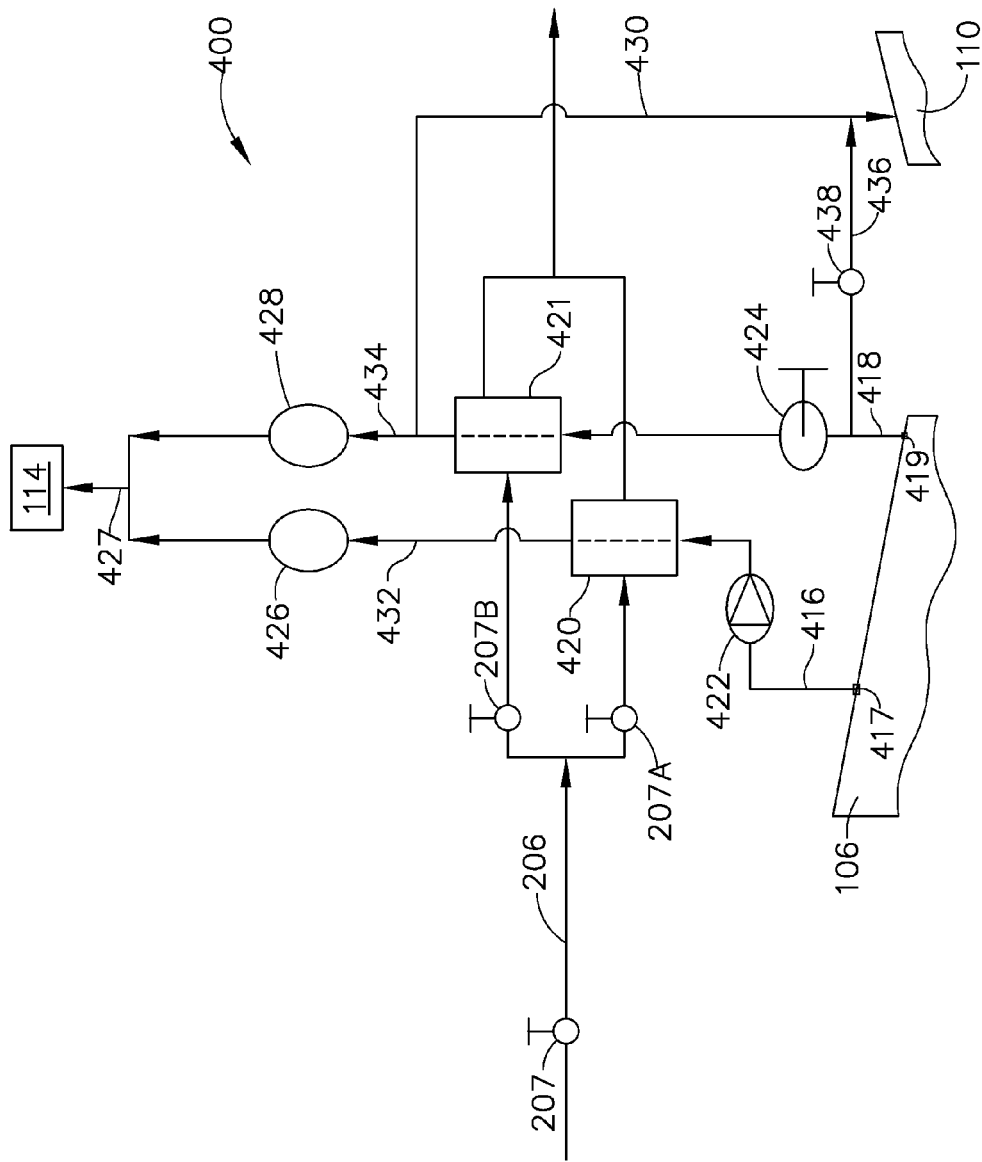
FIG. 4 is a block diagram of an alternative example combined bleed air and hot section component cooling air system.

FIG. 4 is a block diagram of an alternative example combined bleed air and hot section component cooling air system 400, which may be configured to provide bleed air from high-pressure compressor 106 to one or more pneumatic systems 114 and/or to high-pressure turbine 110, according to at least some aspects of the present disclosure. For example, intermediate-pressure bleed air may be taken from high-pressure compressor 106 via an extraction port 417 and an intermediate-pressure bleed air line 416, which may be connected approximate a fourth stage of high-pressure compressor 106, and/or high-pressure bleed air may be taken from high-pressure compressor 106 via an extraction port 419 and a high-pressure bleed air line 418, which may be connected approximate a seventh stage of high-pressure compressor 106.

Intermediate-pressure bleed air line 416 may direct intermediate-pressure bleed air to a precooler 420 and/or high-pressure bleed air line 418 may direct high-pressure bleed air to a precooler 421. Precooler 420 and/or precooler 421 may comprise a heat exchanger configured to transfer heat from the bleed air to ambient air 206, which may be supplied from fan 102 (FIG. 1). Some example embodiments may include fan air valve 207, which may be arranged to allow, prevent, and/or regulate ambient air 206 supplied from fan 102 (FIG. 1). Some example embodiments may include fan air valve 207A (e.g., associated with precooler 420) and/or van air valve 207B (e.g., associated with precooler 421) instead of or in addition to fan air valve 207. Fan air valve 207A and/or fan air valve 207B may be arranged to allow, prevent, and/or regulate ambient air 206 supplied from fan 102 (FIG. 1) to their respective precoolers 420, 421. Precooler 420 and precooler 421 may be separate from each other (e.g., FIG. 4) or may each form a compartment of a precooler comprising a plurality of compartments (e.g., precooler 1120 of FIG. 2B). Precooler 420 may be configured to discharge cooled intermediate-pressure bleed air via an intermediate-pressure discharge line 432 and/or precooler 421 may be configured to discharge cooled high-pressure bleed air via a high-pressure discharge line 434. In some example embodiments, a position (e.g., open-shut) of fan air valve 207 may be controlled at least in part based upon a temperature of cooled intermediate-pressure bleed air in intermediate-pressure discharge line 432 and/or a temperature of cooled high-pressure bleed air in high-pressure discharge line 434. In some example embodiments, a position (e.g., open-shut) of fan air valve 207A may be controlled at least in part based upon the temperature of cooled intermediate-pressure bleed air in intermediate-pressure discharge line 432. In some example embodiments, a position (e.g., open-shut) of fan air valve 207B may be controlled at least in part based upon the temperature of cooled high-pressure bleed air in high-pressure discharge line 434. Intermediate-pressure discharge line 432 may supply pressure-regulated cooled bleed air to pneumatic systems 114 via one or more pressure-regulating valves, such as pressure-regulating shut-off valve 426, and/or pneumatic systems supply line 427. High-pressure discharge line 434 may supply pressure-regulated cooled bleed air to pneumatic systems 114 via a pressure-regulating shut-off valve 428, and/or pneumatic systems supply line 427.

Intermediate-pressure bleed air line 416 and/or high-pressure bleed air line 418 may include one or more valves between high-pressure compressor 106 and precooler 420 and/or precooler 421. For example, intermediate-pressure bleed air line 416 may include a check valve 422, which may be arranged to allow air flow from high-pressure compressor 106 to precooler 420 while substantially preventing air flow from precooler 420 to high-pressure compressor 106. High-pressure bleed air line 418 may include an isolation valve 424, which may be selectively operable to allow and substantially prevent air flow from high-pressure compressor 106 to precooler 421.

Hot section component cooling air may be supplied from high-pressure compressor 106 to high-pressure turbine 110 via high-pressure bleed air line 418, valve 424, precooler 421, high-pressure discharge line 434, and a cooling air line 430, which may be connected to high-pressure discharge line 434. Because cooling air line 430 may receive cooled high-pressure bleed air that has flowed through precooler 421, cooling air line 430 may supply cooling air to high-pressure turbine 110 at a temperature lower than the temperature of high-pressure bleed air taken from high-pressure compressor 106 by high-pressure bleed air line 418.

Some example combined bleed air and hot section component cooling air systems 400 may be configured to supply hot section component cooling air to high-pressure turbine 110 directly from high-pressure compressor 106. For example, some combined bleed air and hot section component cooling air systems 400 may include a bypass line 436, which may include a bypass line valve 438. If it is desired to supply some or all hot section component cooling air directly from high pressure compressor 106, bypass line valve 438 may be partially or fully opened. If it is desired to supply some or all hot section component cooling air via precooler 421, valve 424 may be partially or fully opened. In some example embodiments, valve 424 and/or bypass line valve 438 may be throttled to achieve a desired flow rate therethrough. Some example embodiments may not include isolation valve 424, bypass line 436, and/or bypass line valve 438 (see, e.g., FIG. 5). Some example embodiments may be configured to supply hot section cooling air comprising both cooled air (e.g., via hot section component cooling air line 430) and uncooled air (e.g., via bypass line 436), such as by at least partially opening both valve 424 and bypass line valve 438.

Various example embodiments according to at least some aspects of the present disclosure may include various combinations of separate precoolers (e.g., FIG. 4) or multi-compartment precoolers (e.g., FIGS. 2A and 2B), series flow arrangements (e.g., FIGS. 1, 2A, and 3) or parallel flow arrangements (e.g., FIGS. 2B and 4), and/or single PRSOV arrangements (e.g., FIG. 3) or double PRSOV arrangements (e.g., FIGS. 1 and 4). For example, FIG. 5 is a block diagram of an alternative example combined bleed air and hot section component cooling air system 600, which may include a single PRSOV (generally as illustrated in FIG. 3) in combination with a parallel flow precooler (generally as illustrated in FIGS. 2B and 4), according to at least some aspects of the present disclosure.

Figure 5:
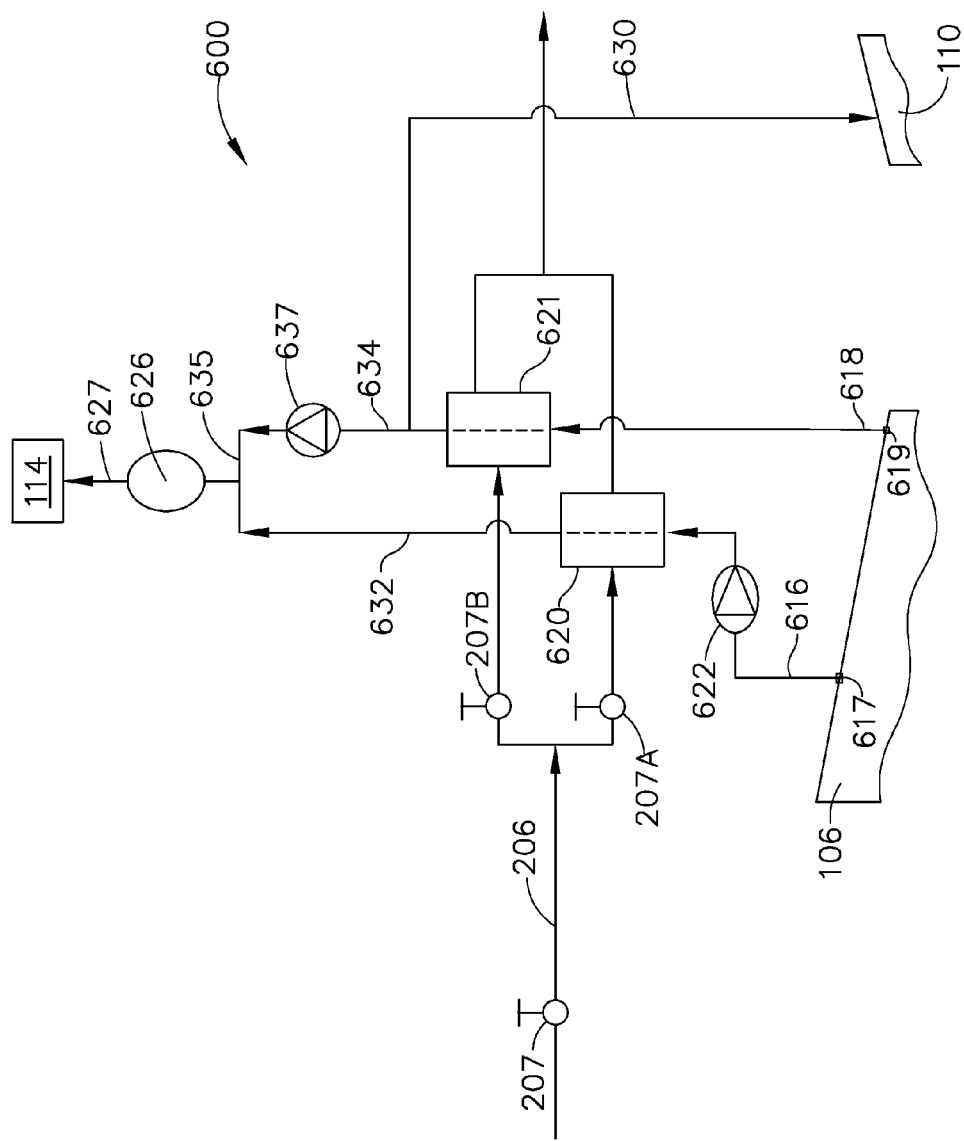
FIG. 5 is a block diagram of an alternative example combined bleed air and hot section component cooling air system.

As illustrated in FIG. 5, combined bleed air and hot section component cooling air system 600 may be configured to provide bleed air from high-pressure compressor 106 to one or more pneumatic systems 114 and/or to high-pressure turbine 110. For example, intermediate-pressure bleed air may be taken from high-pressure compressor 106 via an extraction port 617 and an intermediate-pressure bleed air line 616, which may be connected approximate a fourth stage of high-pressure compressor 106, and/or high-pressure bleed air may be taken from high-pressure compressor 106 via an extraction port 619 and a high-pressure bleed air line 618, which may be connected approximate a seventh stage of high-pressure compressor 106.

Intermediate-pressure bleed air line 616 may direct intermediate-pressure bleed air to a precooler 620 and/or high-pressure bleed air line 618 may direct high-pressure bleed air to a precooler 621. Precooler 620 and/or precooler 621 may comprise a heat exchanger configured to transfer heat from the bleed air to ambient air 206, which may be supplied from fan 102 (FIG. 1). Some example embodiments may include fan air valve 207, which may be arranged to allow, prevent, and/or regulate ambient air 206 supplied from fan 102 (FIG. 1). In some example embodiments, a position of fan air valve 207 may be controlled at least in part due to Some example embodiments may include fan air valve 207A (e.g., associated with precooler 420) and/or van air valve 207B (e.g., associated with precooler 421) instead of or in addition to fan air valve 207. Fan air valve 207A and/or fan air valve 207B may be arranged to allow, prevent, and/or regulate ambient air 206 supplied from fan 102 (FIG. 1) to their respective precoolers 620, 621. Precooler 620 and precooler 621 may be separate from each other (e.g., FIG. 5) or may each form a compartment of a precooler comprising a plurality of compartments (e.g., precooler 1120 of FIG. 2B). Precooler 620 may be configured to discharge cooled intermediate-pressure bleed via an intermediate-pressure discharge line 632 and/or precooler 621 may be configured to discharge cooled high-pressure bleed air via a high-pressure discharge line 634. In some example embodiments, a position (e.g., open-shut) of fan air valve 207 may be controlled at least in part based upon a temperature of cooled intermediate-pressure bleed air in intermediate-pressure discharge line 632 and/or a temperature of cooled high-pressure bleed air in high-pressure discharge line 634. In some example embodiments, a position (e.g., open-shut) of fan air valve 207A may be controlled at least in part based upon the temperature of cooled intermediate-pressure bleed air in intermediate-pressure discharge line 632. In some example embodiments, a position (e.g., open-shut) of fan air valve 207B may be controlled at least in part based upon the temperature of cooled high-pressure bleed air in high-pressure discharge line 634. Intermediate-pressure discharge line 632 and/or high-pressure discharge line 634 may join to form a precooler discharge header 635. Precooler discharge header 635 may supply pressure-regulated cooled bleed air to pneumatic systems 114 via one or more pressure-regulators, such as pressure-regulating shut-off valve 626, and/or pneumatic systems supply line 627.

Intermediate-pressure bleed air line 616 and/or high-pressure bleed air line 618 may include one or more valves between high-pressure compressor 106 and precoolers 620, 621. For example, intermediate-pressure bleed air line 616 may include a check valve 622, which may be arranged to allow air flow from high-pressure compressor 106 to precooler 620 while substantially preventing air flow from precooler 620 to high-pressure compressor 106.

Hot section component cooling air may be supplied from high-pressure compressor 106 to high-pressure turbine 110 via high-pressure bleed air line 618, precooler 621, high-pressure discharge line 634, and a hot section component cooling air line 630, which may be connected to high-pressure discharge line 634. Because hot section component cooling air line 630 may receive cooled high-pressure bleed air that has flowed through precooler 621, cooling air line 630 may supply cooling air to high-pressure turbine 110 at a temperature lower than the temperature of high-pressure bleed air taken from high-pressure compressor 106 by high-pressure bleed air line 618. In some example embodiments, a check valve 637 may be disposed in high-pressure discharge line 634, such as downstream of hot section component cooling air line 630. Some example embodiments may include an isolation valve in high-pressure bleed air line 618 and/or a bypass line connecting high-pressure bleed air line 618 to hot section component cooling air line 630 (see, e.g., FIG. 4). Some example embodiments may be configured to supply hot section cooling air comprising both cooled air (e.g., via hot section component cooling air line 630) and uncooled air (e.g., via a bypass line as illustrated in FIGS. 1, 3, and 4).

FIG. 6 is a flowchart illustrating an example method 500 of operating a combined bleed air and hot section component cooling air system, according to at least some aspects of the present disclosure. Method 500 may include operation 502, which may include withdrawing high-pressure air from a high-pressure stage of a compressor of a gas turbine engine via a high-pressure bleed air line. Operation 502 may be followed by operation 504, which may include cooling at least a first portion of the high-pressure air using a precooler operatively connected to the high-pressure bleed air line to provide cooled high-pressure air via a high-pressure discharge line. Operation 504 may be followed by operation 506, which may include supplying a first portion of the cooled high-pressure air to a hot section component of the gas turbine engine for use as hot section component cooling air via a hot section component cooling air line operatively connected to the high-pressure discharge line. Operation 506 may be followed by operation 508, which may include supplying a second portion of the cooled high-pressure air to a pressure regulator via the high-pressure discharge line, the pressure regulator providing pressure-regulated cooled air to a pneumatic systems supply line. Operation 508 may be followed by operation 510, which may include supplying the pressure-regulated cooled air to at least one pneumatic system via the pneumatic systems supply line.

Some example methods according to at least some aspects of the present disclosure may include supplying a second portion of the high-pressure air to the hot section component for use as hot section component cooling air via a bypass line such that the second portion of the high-pressure air does not flow through the precooler. In some example methods according to at least some aspects of the present disclosure, supplying the pressure-regulated cooled air to the at least one pneumatic system may include supplying the pressure-regulated cooled air to at least one of an environmental control system, an engine starting system, and an anti-icing system. In some example methods according to at least some aspects of the present disclosure, cooling the first portion of the high-pressure air using the precooler may include transferring heat from the high-pressure air to ambient air flowing through the precooler.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A combined bleed air and hot section component cooling air system for a gas turbine engine, the combined bleed air and hot section component cooling air system comprising:
    a high-pressure bleed air line configured to receive high-pressure bleed air from a high-pressure stage of a compressor;
    a first precooler operatively connected to the high-pressure bleed air line to receive at least some of the high-pressure bleed air, transfer heat from the high-pressure bleed air to ambient air, and discharge cooled high-pressure bleed air;
    a high-pressure discharge line operatively connected to the first precooler to receive the cooled high-pressure bleed air;
    a first pressure regulator in the high-pressure discharge line, the first pressure regulator being configured to receive at least some of the cooled high-pressure bleed air and discharge pressure-regulated cooled bleed air;
    a pneumatic systems supply line operatively connected to the high-pressure discharge line downstream of the first pressure regulator to receive the pressure-regulated cooled bleed air; and
    a hot section component cooling air line operatively connected to the high-pressure discharge line upstream of the first pressure regulator and configured to convey at least some of the cooled high-pressure bleed air to a hot section component for use as hot section component cooling air, further comprising
    an intermediate-pressure bleed air line configured to receive intermediate-pressure bleed air from an intermediate stage of the compressor and supply the intermediate-pressure bleed air to the first precooler, the first precooler being configured to receive the intermediate-pressure bleed air, transfer heat from the intermediate-pressure bleed air to ambient air, and discharge cooled intermediate-pressure bleed air;
    an intermediate-pressure discharge line operatively connected to the first precooler to receive the cooled intermediate-pressure bleed air;
    a second pressure regulator in the intermediate-pressure discharge line, the second pressure regulator being configured to receive at least some of the cooled intermediate-pressure bleed air and discharge pressure-regulated cooled bleed air to the pneumatic systems supply line.

2. The combined bleed air and hot section component cooling air system of claim 1, wherein the first precooler comprises a first compartment for cooling the high-pressure bleed air and a second compartment for cooling the intermediate-pressure bleed air.

3. A combined bleed air and hot section component cooling air system for a gas turbine engine, the combined bleed air and hot section component cooling air system comprising:

a high-pressure bleed air line configured to receive high-pressure bleed air from a high-pressure stage of a compressor;

a first precooler operatively connected to the high-pressure bleed air line to receive at least some of the high-pressure bleed air, transfer heat from the high-pressure bleed air to ambient air, and discharge cooled high-pressure bleed air;

a high-pressure discharge line operatively connected to the first precooler to receive the cooled high-pressure bleed air;

a first pressure regulator in the high-pressure discharge line, the first pressure regulator being configured to receive at least some of the cooled high-pressure bleed air and discharge pressure-regulated cooled bleed air;

a pneumatic systems supply line operatively connected to the high-pressure discharge line downstream of the first pressure regulator to receive the pressure-regulated cooled bleed air; and a hot section component cooling air line operatively connected to the high-pressure discharge line upstream of the first pressure regulator and configured to convey at least some of the cooled high-pressure bleed air to a hot section component for use as hot section component cooling air, further comprising an intermediate-pressure bleed air line configured to receive intermediate-pressure bleed air from an intermediate stage of the compressor and supply the intermediate-pressure bleed air to the first precooler, the first precooler being configured to receive the intermediate-pressure bleed air, transfer heat from the intermediate-pressure bleed air to ambient air, and discharge cooled intermediate-pressure bleed air; and an intermediate-pressure discharge line operatively connected to the first precooler to supply the cooled intermediate-pressure bleed air to the first pressure regulator;

where the first pressure regulator is configured to receive at least some of the cooled intermediate-pressure bleed air and discharge pressure-regulated cooled bleed air.

4. The combined bleed air and hot section component cooling air system of claim 3, wherein the first precooler includes a first compartment for cooling the high-pressure bleed air and a second compartment for cooling the intermediate-pressure bleed air.

5. A combined bleed air and hot section component cooling air system for a gas turbine engine, the combined bleed air and hot section component cooling air system comprising:

a high-pressure bleed air line configured to receive high-pressure bleed air from a high-pressure stage of a compressor;

a first precooler operatively connected to the high-pressure bleed air line to receive at least some of the high-pressure bleed air, transfer heat from the high-pressure bleed air to ambient air, and discharge cooled high-pressure bleed air;

a high-pressure discharge line operatively connected to the first precooler to receive the cooled high-pressure bleed air;

a first pressure regulator in the high-pressure discharge line, the first pressure regulator being configured to receive at least some of the cooled high-pressure bleed air and discharge pressure-regulated cooled bleed air;

a pneumatic systems supply line operatively connected to the high-pressure discharge line downstream of the first pressure regulator to receive the pressure-regulated cooled bleed air; and a hot section component cooling air line operatively connected to the high-pressure discharge line upstream of the first pressure regulator and configured to convey at least some of the cooled high-pressure bleed air to a hot section component for use as hot section component cooling air, further comprising an intermediate-pressure bleed air line configured to receive intermediate-pressure bleed air from an intermediate stage of the compressor;

a second precooler operatively connected to the intermediate-pressure bleed air line to receive the intermediate-pressure bleed air, transfer heat from the intermediate-pressure bleed air to ambient air, and discharge cooled intermediate-pressure bleed air;

an intermediate-pressure discharge line operatively connected to the second precooler to receive the cooled intermediate-pressure bleed air;

a second pressure regulator in the intermediate-pressure discharge line, the second pressure regulator being configured to receive at least some of the cooled intermediate-pressure bleed air and discharge pressure-regulated cooled bleed air to the pneumatic systems supply line.

6. The combined bleed air and hot section component cooling air system of claim 5, wherein the first precooler and the second precooler are disposed approximate one another to comprise a two-compartment precooler.

7. A combined bleed air and hot section component cooling air system for a gas turbine engine, the combined bleed air and hot section component cooling air system comprising:

a high-pressure bleed air line configured to receive high-pressure bleed air from a high-pressure stage of a compressor;

a first precooler operatively connected to the high-pressure bleed air line, the first precooler being configured to receive at least some of the high-pressure bleed air, transfer heat from the high-pressure bleed air to ambient air, and discharge cooled high-pressure bleed air;

a high-pressure discharge line operatively connected to the first precooler to receive the cooled high-pressure bleed air;

an intermediate-pressure bleed air line configured to receive intermediate-pressure bleed air from an intermediate stage of the compressor;

a second precooler operatively connected to the intermediate-pressure bleed air line, the second precooler being configured to receive the intermediate-pressure bleed air, transfer heat from the intermediate-pressure bleed air to the ambient air, and discharge cooled intermediate-pressure bleed air;

an intermediate-pressure discharge line operatively connected to the second precooler to receive the cooled intermediate-pressure bleed air;

a first pressure regulator operatively connected to at least one of the high-pressure discharge line and the intermediate-pressure discharge line, the first pressure regulator being operative to discharge pressure-regulated cooled bleed air;

a pneumatic systems supply line operatively connected to the first pressure regulator to receive the pressure-regulated cooled bleed air; and a hot section component cooling air line operatively connected to the high-pressure discharge line upstream of the pressure regulator and configured to convey at least some of the cooled high-pressure bleed air to a hot section component for use as hot section component cooling air, wherein the first pressure regulator is in the high-pressure discharge line and is configured to receive at least some of the cooled high-pressure bleed air; and further including a second pressure regulator in the intermediate-pressure discharge line, the second pressure regulator being configured to receive at least some of the cooled intermediate-pressure bleed air and discharge pressure-regulated cooled bleed air to the pneumatic systems supply line.

8. The combined bleed air and hot section component cooling air system of claim 7, wherein the first pressure regulator is operatively connected to both the high-pressure discharge line and the intermediate-pressure discharge line via a precooler discharge header.

9. A method of operating a combined bleed air and hot section component cooling air system associated with a gas turbine engine, the method including:

withdrawing high-pressure air from a high-pressure stage of a compressor of a gas turbine engine via a high-pressure bleed air line;

cooling at least a first portion of the high-pressure air using a precooler operatively connected to the high-pressure bleed air line to provide cooled high-pressure air via a high-pressure discharge line;

supplying a first portion of the cooled high-pressure air to a hot section component of the gas turbine engine for use as hot section component cooling air via a hot section component cooling air line operatively connected to the high-pressure discharge line;

supplying a second portion of the cooled high-pressure air to a pressure regulator via the high-pressure discharge line, the pressure regulator providing pressure-regulated cooled air to a pneumatic systems supply line; and supplying the pressure-regulated cooled air to at least one pneumatic system via the pneumatic systems supply line, further comprising withdrawing intermediate-pressure air from an intermediate-pressure stage of the compressor;

cooling the intermediate-pressure air using the precooler to provide cooled intermediate-pressure air; and supplying the cooled intermediate-pressure air to a second pressure regulator, the second pressure regulator providing pressure-regulated cooled air to the pneumatic systems supply line.

10. The method of claim 9, wherein the precooler comprises a two-compartment precooler having a first compartment associated with high-pressure air and a second compartment associated with intermediate-pressure air.

* * * * *

UNITED STATES PATENT AND TRADEMARK OFFICE
CERTIFICATE OF CORRECTION

| | | |
|---|---|---|
| PATENT NO. | : 9,222,411 B2 | Page 1 of 1 |
| APPLICATION NO. | : 13/537284 | |
| DATED | : December 29, 2015 | |
| INVENTOR(S) | : Sennoun | |

It is certified that error appears in the above-identified patent and that said Letters Patent is hereby corrected as shown below:

In the Specification

In Column 4, Line 10, delete "high-pressure turbine 106" and insert -- high-pressure turbine 110 --, therefor.

In Column 4, Lines 11-12, delete "high-pressure turbine 106." and insert -- high-pressure turbine 110. --, therefor.

Signed and Sealed this
Seventh Day of June, 2016

Michelle K. Lee
*Director of the United States Patent and Trademark Office*